(12) United States Patent
Kim et al.

(10) Patent No.: US 10,269,125 B1
(45) Date of Patent: Apr. 23, 2019

(54) METHOD FOR TRACKING OBJECT BY USING CONVOLUTIONAL NEURAL NETWORK INCLUDING TRACKING NETWORK AND COMPUTING DEVICE USING THE SAME

(71) Applicant: StradVision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/152,937

(22) Filed: Oct. 5, 2018

(51) Int. Cl.
*G06K 9/00* (2006.01)
*G06T 7/246* (2017.01)
*G06T 7/277* (2017.01)
*G06K 9/62* (2006.01)

(52) U.S. Cl.
CPC .......... *G06T 7/248* (2017.01); *G06K 9/00718* (2013.01); *G06K 9/6256* (2013.01); *G06K 9/6262* (2013.01); *G06T 7/277* (2017.01); *G06T 2207/10016* (2013.01); *G06T 2207/20081* (2013.01); *G06T 2207/20084* (2013.01)

(58) Field of Classification Search
CPC ..................... G06T 7/248; G06T 7/277; G06T 2207/20084; G06T 2207/10016; G06T 2207/20081; G06K 9/6256; G06K 9/6262; G06K 9/00718
See application file for complete search history.

(56) References Cited

U.S. PATENT DOCUMENTS 9,070,202 B2 * 6/2015 Chandraker ............ G06T 7/277
10,127,439 B2 * 11/2018 Wang ................. G06K 9/00362
2018/0232906 A1 * 8/2018 Kim .......................... G06T 7/75

* cited by examiner

*Primary Examiner* — Phuoc Tran
(74) *Attorney, Agent, or Firm* — Husch Blackwell LLP

(57) ABSTRACT

A method for tracking an object by using a CNN including a tracking network is provided. The method includes steps of: a testing device (a) generating a feature map by using a current video frame, and instructing an RPN to generate information on proposal boxes; (b) (i) generating an estimated state vector by using a Kalman filter algorithm, generating an estimated bounding box, and determining a specific proposal box as a seed box, and (ii) instructing an FCN to apply full convolution operations to the feature map, to thereby output a position sensitive score map; (c) generating a current bounding box by referring to a regression delta and a seed box which are generated by instructing a pooling layer to pool a region, corresponding to the seed box, on the position sensitive score map, and adjusting the current bounding box by using the Kalman filter algorithm.

26 Claims, 10 Drawing Sheets

METHOD FOR TRACKING OBJECT BY USING CONVOLUTIONAL NEURAL NETWORK INCLUDING TRACKING NETWORK AND COMPUTING DEVICE USING THE SAME

FIELD OF THE INVENTION

The present invention relates to a method for tracking at least one object by using a CNN including a tracking network; and more particularly, to the method for tracking the object by using the CNN including the tracking network, including steps of: (a) generating at least one feature map by using a current video frame of an inputted video, and instructing an RPN to apply at least one operation to the feature map, to thereby generate information on one or more proposal boxes corresponding to the object; (b) (i) (i-1) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (i-2) generating at least one estimated bounding box, wherein the estimated bounding box corresponding to the estimated state vector includes information on an estimated position, on the current video frame, tracked from a location of the previous bounding box, and (i-3) determining at least one specific proposal box selected by referring to the estimated bounding box among the proposal boxes as at least one seed box, and (ii) instructing an FCN to apply one or more full convolution operations to the feature map, to thereby output at least one position sensitive score map; (c) instructing at least one pooling layer to pool at least one region, corresponding to the seed box, on the position sensitive score map, to thereby generate at least one regression delta and at least one class score corresponding to the specific proposal box; and (d) generating at least one current bounding box corresponding to the object on the current video frame by referring to the regression delta and the seed box, and adjusting the current bounding box by using the Kalman filter algorithm, and a testing device using the same.

BACKGROUND OF THE INVENTION

Object tracking, also called visual tracking, is the process that detects, extracts, identifies and locates the target in a sequence of images or a video. It is a fundamental computer vision task with a wide range of real-world applications, including traffic flow monitoring, medical diagnostic, visual surveillance and human-computer interaction.

Most of the existing appearance-based tracking methods have been posed as a tracking-by-detection problem. According to the model-construction mechanism, statistical modeling is classified into three categories, including generative, discriminative and hybrid generative-discriminative. One major drawback is that they rely on low-level hand-crafted features which are incapable to capture semantic information of targets, not robust to significant appearance changes, and only have limited discriminative power. While much breakthrough has been made within several decades, the problem can be very challenging in many practical applications due to factors such as partial occlusion, cluttered background, fast and abrupt motion, dramatic illumination changes, and large variations in viewpoint and pose.

Deep learning has dramatically improved the state-of-the-art in processing text, images, video, speech and many other domains such as drug discovery and genomics, since proposed in 2006.

Especially, Convolutional Neural Networks (CNNs) have recently been applied to various computer vision tasks such as image classification, semantic segmentation, object detection, and many others.

Such great success of CNNs is mostly attributed to their outstanding performance in representing visual data. Object tracking, however, has been less affected by these popular trends since it is difficult to collect a large amount of training data for video processing applications and training algorithms specialized for object tracking are not available yet, while the approaches based on low-level handcraft features still work well in practice. Several recent tracking algorithms have addressed the data deficiency issue by transferring pretrained CNNs on a large-scale classification dataset such as ImageNet.

Although these methods may be sufficient to obtain generic feature representations, its effectiveness in terms of tracking is limited due to the fundamental inconsistency between classification and tracking problems, i.e., predicting object class labels versus locating targets of arbitrary classes.

SUMMARY OF THE INVENTION

It is an object of the present invention to solve all the aforementioned problems.

It is another object of the present invention to provide a method for tracking at least one object by using a CNN including a tracking network.

It is yet another object of the present invention to provide the CNN including the tracking network without a need for learning of tracking the object.

It is still yet another object of the present invention to provide the method for tracking the object by using the CNN learned by an object detector.

It is still yet another object of the present invention to provide the method for tracking the object with less computation compared to a conventional CNN for an object detection.

In accordance with one aspect of the present invention, there is provided a method for tracking at least one object by using a CNN including a tracking network, including steps of: (a) a testing device, generating at least one feature map by using a current video frame of an inputted video, and instructing an RPN to apply at least one operation to the feature map, to thereby generate information on one or more proposal boxes corresponding to the object; (b) the testing device (i) (i-1) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (i-2) generating at least one estimated bounding box, wherein the estimated bounding box corresponding to the estimated state vector includes information on an estimated position, on the current video frame, tracked from a location of the previous bounding box, and (i-3) determining at least one specific proposal box selected by referring to the estimated bounding box among the proposal boxes as at least one seed box, and (ii) instructing an FCN to apply one or more full convolution operations to the feature map, to thereby output at least one position sensitive score map; (c)

the testing device instructing at least one pooling layer to pool at least one region, corresponding to the seed box, on the position sensitive score map, to thereby generate at least one regression delta and at least one class score corresponding to the specific proposal box; and (d) the testing device generating at least one current bounding box corresponding to the object on the current video frame by referring to the regression delta and the seed box, and adjusting the current bounding box by using the Kalman filter algorithm.

As one example, at the step of (b), the testing device generates at least one estimated error covariance of the current video frame by referring to at least one previous error covariance of the previous video frame, by using the Kalman filter algorithm.

As one example, at the step of (d), the testing device generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

As one example, at the step of (c), the testing device applies a pooling operation to the at least one region, corresponding to the seed box, on the position sensitive score map, and applies a global-pooling operation to the pooled position sensitive score map, to thereby output the regression delta and the class score corresponding to the specific proposal box.

As one example, at the step of (b), the testing device determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

As one example, at the step of (a), the testing device instructs at least one convolutional layer to apply one or more convolution operations to the current video frame, to thereby generate the feature map, and instructs the RPN to output the proposal boxes corresponding to regions estimated as including the object on the feature map.

As one example, before the step of (a), a learning device (i) has instructed the convolutional layer to apply one or more convolution operations to at least one training image, to thereby generate at least one feature map for training, (ii) (ii-1) has instructed the RPN to generate each of one or more proposal boxes for training corresponding to each region estimated as including at least one object for training on the feature map for training, (ii-2) has instructed the FCN to apply one or more full convolution operations to the feature map for training, to thereby generate at least one position sensitive score map for training, (iii) has instructed the pooling layer to pool said each region on the position sensitive score map for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn parameters of the FCN and the convolutional layer by backpropagating the loss.

In accordance with another aspect of the present invention, there is provided a method for tracking at least one object by using a CNN including a tracking network, including steps of: (a) a testing device, generating at least one feature map by using a current video frame of an inputted video, and instructing an RPN to apply at least one operation to the feature map, to thereby generate information on one or more proposal boxes corresponding to the object; (b) the testing device (i) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (ii) generating at least one estimated bounding box, wherein the estimated bounding box corresponding to the estimated state vector includes information on an estimated position, on the current video frame, tracked from a location of the previous bounding box, and (iii) determining at least one specific proposal box selected by referring to the estimated bounding box among the proposal boxes as at least one seed box; (c) the testing device instructing at least one pooling layer to pool at least one region, corresponding to the seed box, on the feature map, to thereby generate at least one feature vector, and instructing at least one FC layer to apply at least one fully connected operation to the feature vector, to thereby generate at least one regression delta and at least one class score corresponding to the specific proposal box; and (d) the testing device generating at least one current bounding box corresponding to the object on the current video frame by referring to the regression delta and the seed box, and adjusting the current bounding box by using the Kalman filter algorithm.

As one example, at the step of (b), the testing device generates at least one estimated error covariance of the current video frame by referring to at least one previous error covariance of the previous video frame, by using the Kalman filter algorithm.

As one example, at the step of (d), the testing device generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

As one example, at the step of (b), the testing device determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

As one example, at the step of (a), the testing device instructs at least one convolutional layer to apply one or more convolution operations to the current video frame, to thereby generate the feature map, and instructs the RPN to output the proposal boxes corresponding to regions estimated as including the object on the feature map.

As one example, before the step of (a), a learning device (i) has instructed the convolutional layer to apply the convolution operations to at least one training image, to thereby generate at least one feature map for training, (ii) has instructed the RPN to generate each of one or more proposal boxes for training corresponding to each region estimated as including at least one object for training on the feature map for training, (iii) has instructed the pooling layer to pool said each region, corresponding to said each of the proposal boxes for training, on the feature map for training, to thereby generate at least one feature vector for training, corresponding to said each of the proposal boxes for training, and has instructed the FC layer to apply the fully connected operation to the feature vector for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn parameters of the FCN and the convolutional layer by backpropagating the loss.

In accordance with still another aspect of the present invention, there is provided a testing device for tracking at least one object by using a CNN including a tracking network, including: a communication part for acquiring at least one current video frame of an inputted video; and a processor for performing processes of (I) generating at least one feature map by using the current video frame, and instructing an RPN to apply at least one operation to the feature map, to thereby generate information on one or more proposal boxes corresponding to the object, (II) (II-1) (i) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (ii) generating at least one estimated bounding box, wherein the estimated bounding box corresponding to the estimated state vector includes information on an estimated position, on the current video frame, tracked from a location of the previous bounding box, and (iii) determining at least one specific proposal box selected by referring to the estimated bounding box among the proposal boxes as at least one seed box, and (II-2) instructing an FCN to apply one or more full convolution operations to the feature map, to thereby output at least one position sensitive score map, (III) instructing at least one pooling layer to pool at least one region, corresponding to the seed box, on the position sensitive score map, to thereby generate at least one regression delta and at least one class score corresponding to the specific proposal box, and (IV) generating at least one current bounding box corresponding to the object on the current video frame by referring to the regression delta and the seed box, and adjusting the current bounding box by using the Kalman filter algorithm.

As one example, at the process of (II), the processor generates at least one estimated error covariance of the current video frame by referring to at least one previous error covariance of the previous video frame, by using the Kalman filter algorithm.

As one example, at the process of (IV), the processor generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

As one example, at the process of (III), the processor applies a pooling operation to the at least one region, corresponding to the seed box, on the position sensitive score map, and applies a global-pooling operation to the pooled position sensitive score map, to thereby output the regression delta and the class score corresponding to the specific proposal box.

As one example, at the process of (II), the processor determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

As one example, at the process of (I), if at least one test image corresponding to the current video frame is acquired, the processor instructs at least one convolutional layer to apply one or more convolution operations to the test image, to thereby generate the feature map, and instructs the RPN to output the proposal boxes corresponding to regions estimated as including the object on the feature map.

As one example, before the process of (I), a learning device (i) has instructed the convolutional layer to apply one or more convolution operations to at least one training image, to thereby generate at least one feature map for training, (ii) (ii-1) has instructed the RPN to generate each of one or more proposal boxes for training corresponding to each region estimated as including at least one object for training on the feature map for training, (ii-2) has instructed the FCN to apply one or more full convolution operations to the feature map for training, to thereby generate at least one position sensitive score map for training, (iii) has instructed the pooling layer to pool said each region on the position sensitive score map for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn the parameters of the FCN and the convolutional layer by backpropagating the loss.

In accordance with still yet another aspect of the present invention, there is provided a testing device for tracking at least one object by using a CNN including a tracking network, including: a communication part for acquiring at least one current video frame of an inputted video; and a processor for performing processes of (I) generating at least one feature map by using the current video frame, and instructing an RPN to apply at least one operation to the feature map, to thereby generate information on one or more proposal boxes corresponding to the object, (II) (i) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (ii) generating at least one estimated bounding box, wherein the estimated bounding box corresponding to the estimated state vector includes information on an estimated position, on the current video frame, tracked from a location of the previous bounding box, and (iii) determining at least one specific proposal box selected by referring to the estimated bounding box among the proposal boxes as at least one seed box, (III) instructing at least one pooling layer to pool at least one region, corresponding to the seed box, on the feature map, to thereby generate at least one feature vector, and instructing at least one FC layer to apply at least one fully connected operation to the feature vector, to thereby generate at least one regression delta and at least one class score corresponding to the specific proposal box, and (IV) generating at least one current bounding box corresponding to the object on the current video frame by referring to the regression delta and the seed box, and adjusting the current bounding box by using the Kalman filter algorithm.

As one example, at the process of (II), the processor generates at least one estimated error covariance of the current video frame by referring to at least one previous error covariance of the previous video frame, by using the Kalman filter algorithm.

As one example, at the process of (IV), the processor generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

As one example, at the process of (II), the processor determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

As one example, at the process of (I), the processor instructs at least one convolutional layer to apply one or more convolution operations to the current video frame, to thereby generate the feature map, and instructs the RPN to output the proposal boxes corresponding to regions estimated as including the object on the feature map.

As one example, before the process of (I), a learning device (i) has instructed the convolutional layer to apply the convolution operations to at least one training image, to thereby generate at least one feature map for training, (ii) has instructed the RPN to generate each of one or more proposal boxes for training corresponding to each region estimated as including at least one object for training on the feature map for training, (iii) has instructed the pooling layer to pool said each region, corresponding to said each of the proposal boxes for training, on the feature map for training, to thereby generate at least one feature vector for training, corresponding to said each of the proposal boxes for training, and has instructed the FC layer to apply the fully connected operation to the feature vector for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn the parameters of the FCN and the convolutional layer by backpropagating the loss.

In addition, recordable media that are readable by a computer for storing a computer program to execute the method of the present invention is further provided.

BRIEF DESCRIPTION OF THE DRAWINGS

The above and other objects and features of the present invention will become apparent from the following description of preferred embodiments given in conjunction with the accompanying drawings.

The following drawings to be used to explain example embodiments of the present invention are only part of example embodiments of the present invention and other drawings can be obtained based on the drawings by those skilled in the art of the present invention without inventive work.

DETAILED DESCRIPTION OF THE PREFERRED EMBODIMENTS

Figure 1:
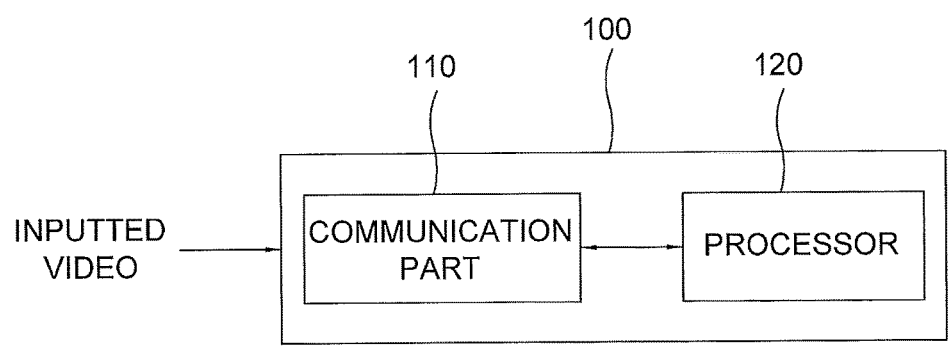
FIG. 1 is a drawing schematically illustrating a testing device for tracking at least one object by using a CNN including a tracking network in accordance with one example embodiment of the present invention.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

For reference, in the description below, the phrase "for training" is added for terms related to the learning processes, and the phrase "for testing" is added for terms related to testing processes, to avoid possible confusion.

To allow those skilled in the art to the present invention to be carried out easily, the example embodiments of the present invention by referring to attached diagrams will be explained in detail as shown below.

FIG. 1 is a drawing schematically illustrating a testing device 100 for tracking at least one object by using a CNN (Convolutional Neural Network) including a tracking network in accordance with one example embodiment of the present invention, and by referring to FIG. 1, the testing device 100 may include a communication part 110 and a processor 120.

First, the communication part 110 may receive at least one current video frame of an inputted video. Herein, the inputted video may include a sequence of images.

Then, the processor 120 may perform (i) a first process of generating at least one feature map by using the current video frame, and instructing an RPN (Region Proposal Network) to apply at least one operation to the feature map, to thereby generate information on one or more proposal boxes corresponding to the object, (ii) a second process of (ii-1) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (ii-2) generating at least one estimated bounding box, wherein the estimated bounding box corresponding to the estimated state vector includes information on an estimated position, on the current video frame, tracked from the previous bounding box, (ii-3) determining at least one specific proposal box selected by referring to the estimated bounding box among the proposal boxes as at least one seed box, and (ii-4) instructing an FCN (Fully Convolutional Network) to apply one or more full convolution operations to the feature map, to thereby output at least one position sensitive score map, (iii) a third process of instructing at least one pooling layer to pool at least one region, corresponding to the seed box, on the position sensitive score map, to thereby generate at least one regression delta, e.g., dx, dy, dw, and dh, and at least one class score corresponding to the specific proposal box, and (iv) a fourth process of generating at least one current bounding box corresponding to the object on the current video frame by referring to the regression delta and the seed box, and adjusting the current bounding box by using the Kalman filter algorithm.

Herein, the testing device 100 in accordance with one example embodiment of the present invention may be a computing device, and may be any device with a processor capable of computation. For reference, although FIG. 1 shows the single testing device 100, the scope of the present invention is not limited thereto. For example, the testing device may be configured as several devices to perform its functions.

Figure 2:
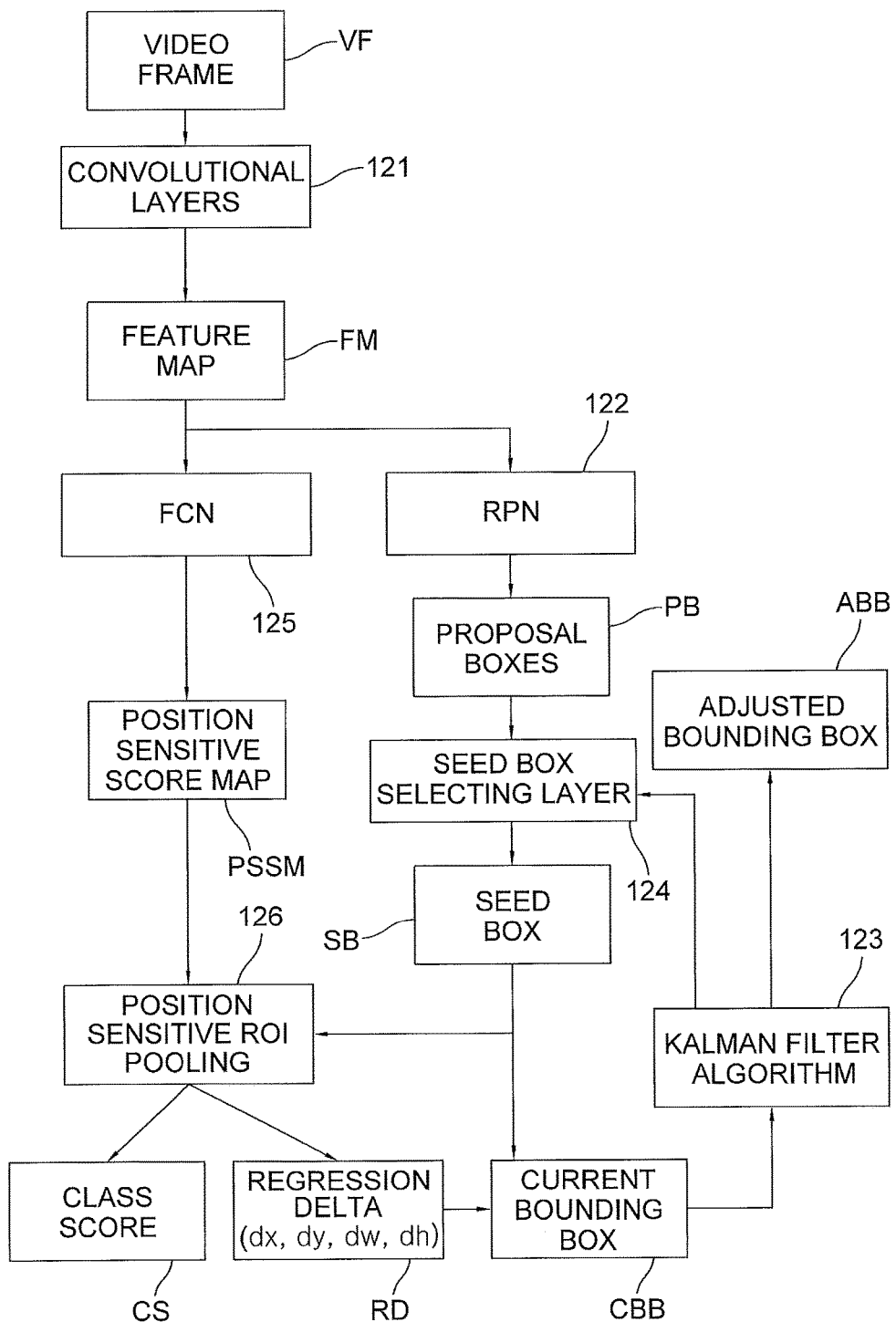
FIG. 2 is a drawing schematically illustrating the method for tracking the object by using the CNN including the tracking network in accordance with one example embodiment of the present invention.

A method for tracking the objects by using the testing device 100 utilizing the CNN including the tracking network in accordance with one example embodiment of the present invention is described by referring to FIG. 2 as follows.

First, the testing device 100 may generate the feature map FM from the current video frame VF of the inputted video.

Figure 3:
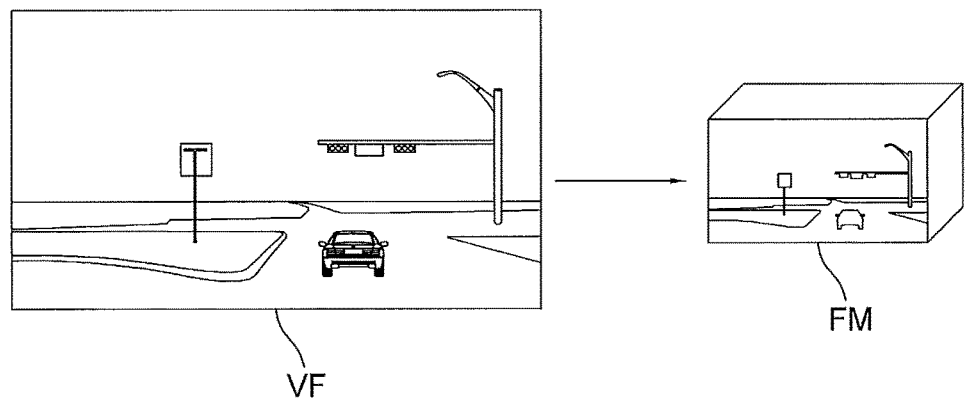
FIG. 3 is a drawing schematically illustrating a process of generating at least one feature map in the method for tracking the object by using the CNN including the tracking network in accordance with one example embodiment of the present invention.

As one example, by referring to FIG. 3, if a video taken by a vision sensor, not illustrated, is inputted, the testing device 100 may acquire or support another device to acquire the current video frame VF of the video, and may instruct one or more convolutional layers 121 to apply one or more convolution operations to the current video frame VF, to thereby output the feature map FM. Herein, the current video frame VF may be an image having a size of 1280×720 with three channels of RGB, and the feature map FM may have a size of 40×23 with 256 channels, but each size and each channel depth are not limited thereto.

Next, the testing device 100 may input the feature map FM into the RPN 122, and may instruct the RPN to apply at least one operation to the feature map, to thereby generate information on the proposal boxes PB corresponding to the object.

Figure 4:
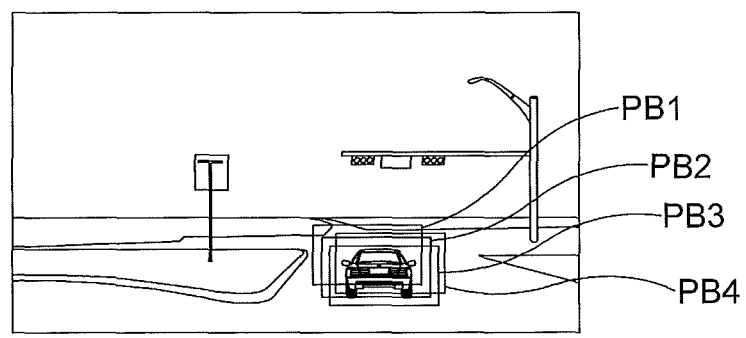
FIG. 4 is a drawing schematically illustrating a process of generating one or more proposal boxes in the method for tracking the object by using the CNN including the tracking network in accordance with one example embodiment of the present invention.

As one example, by referring to FIG. 4, the testing device 100 may instruct the RPN 122 to output the proposal boxes PB1, PB2, PB3, and PB4 corresponding to regions estimated as including the object on the feature map FM. Herein, FIG. 4 shows four proposal boxes PB1, PB2, PB3, and PB4 for convenience of explanation, but the number of proposal boxes corresponding to the object is not limited thereto. Further, only a single object to be tracked is illustrated in FIG. 4, but the scope of the present invention is not limited thereto. That is, the number of objects to be tracked may be more than one, and multiple proposal boxes for each of multiple objects to be tracked may be generated. Also, in FIG. 4, the multiple proposal boxes PB1, PB2, PB3, and PB4 are illustrated in the current video frame VF, but this is only for convenience of explanation.

By referring to FIG. 2 again, the testing device 100 may generate or support another device to generate at least one estimated bounding box EBB which is a bounding box, tracked from a previous bounding box, whose position is estimated as at least one position of the object in the current video frame VF by using the Kalman filter algorithm 123, where the previous bounding box is a bounding box corresponding to the object located in the previous video frame.

Figure 5:
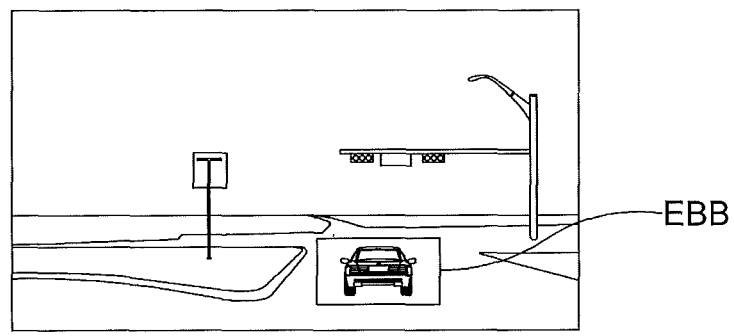
FIG. 5 is a drawing schematically illustrating a process of generating at least one estimated bounding box in the method for tracking the object by using the CNN including the tracking network in accordance with one example embodiment of the present invention.

As one example, by referring to FIG. 5, the testing device 100 may perform or support another device to perform processes of (i) generating at least one estimated state vector of at least one previous bounding box, which has at least one possibility of including the object on the current video frame VF, from at least one previous state vector of the previous bounding box, not illustrated, corresponding to the object positioned on the previous video frame by using the Kalman filter algorithm 123, and (ii) generating at least one estimated bounding box EBB, where the estimated bounding box corresponding to the estimated state vector includes information on an estimated position, on the current video frame VF, tracked from the previous bounding box.

Also, the testing device 100 may generate at least one estimated error covariance of the current video frame by referring to at least one previous error covariance of the previous video frame, by using the Kalman filter algorithm 123.

Figure 6:
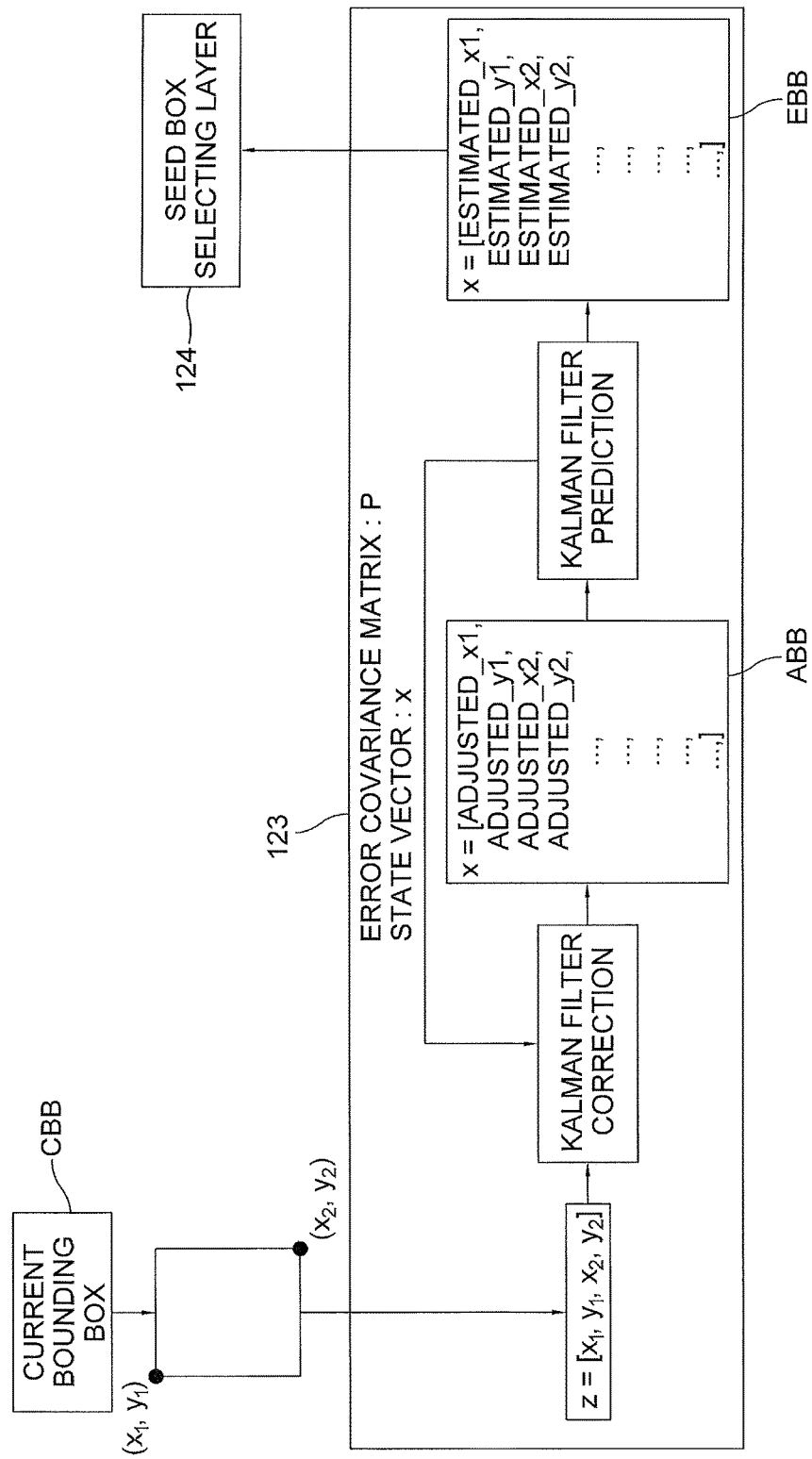
FIG. 6 is a drawing schematically illustrating a Kalman filter algorithm in the method for tracking the object by using the CNN including the tracking network in accordance with one example embodiment of the present invention.
Figure 7:
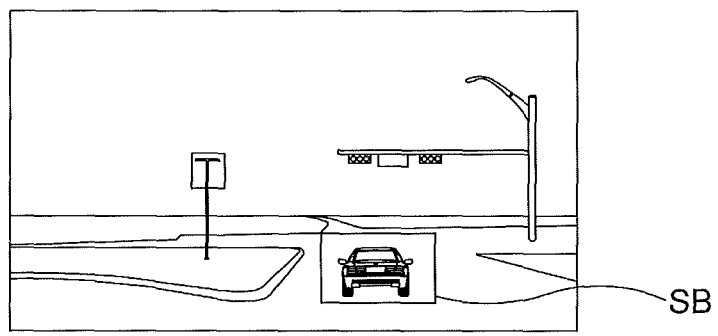
FIG. 7 is a drawing schematically illustrating a process of generating at least one seed box in the method for tracking the object by using the CNN including the tracking network in accordance with one example embodiment of the present invention.
Figure 8:
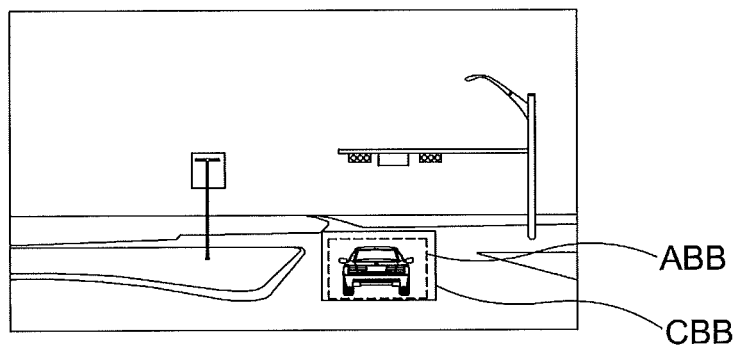
FIG. 8 is a drawing schematically illustrating a process of generating at least one bounding box of the object in the method for tracking the object by using the CNN including the tracking network in accordance with one example embodiment of the present invention.

Herein, by referring to FIG. 6, a process of generating the estimated bounding box EBB and the estimated error covariance by using the Kalman filter algorithm is described in detail as follows.

First, the Kalman filter may be set up as follows.

1. transition matrix: 12×12
A=[1, 0, 0, 0, 1, 0, 0, 0, 0.5, 0, 0, 0,
0, 1, 0, 0, 0, 1, 0, 0, 0, 0.5, 0, 0,
0, 0, 1, 0, 0, 0, 1, 0, 0, 0, 0.5, 0,
0, 0, 0, 1, 0, 0, 0, 1, 0, 0, 0, 0.5,
0, 0, 0, 0, 1, 0, 0, 0, 1, 0, 0, 0,
0, 0, 0, 0, 0, 1, 0, 0, 0, 1, 0, 0,
0, 0, 0, 0, 0, 0, 1, 0, 0, 0, 1, 0,
0, 0, 0, 0, 0, 0, 0, 1, 0, 0, 0, 1,
0, 0, 0, 0, 0, 0, 0, 0, 1, 0, 0, 0,
0, 0, 0, 0, 0, 0, 0, 0, 0, 1, 0, 0,
0, 0, 0, 0, 0, 0, 0, 0, 0, 0, 1, 0,
0, 0, 0, 0, 0, 0, 0, 0, 0, 0, 0, 1]

2. observation matrix: 4×12
H=[1, 0, 0, 0, 0, 0, 0, 0, 0, 0, 0, 0,
0, 1, 0, 0, 0, 0, 0, 0, 0, 0, 0, 0,
0, 0, 1, 0, 0, 0, 0, 0, 0, 0, 0, 0,
0, 0, 0, 1, 0, 0, 0, 0, 0, 0, 0, 0]

3. measurement noise covariance matrix: 4×4
R=[r, 0, 0, 0,
0, r, 0, 0,
0, 0, r, 0,
0, 0, 0, r]

4. process noise covariance matrix: 12×12
Q=[q, 0, 0, 0, 0, 0, 0, 0, 0, 0, 0, 0,
0, q, 0, 0, 0, 0, 0, 0, 0, 0, 0, 0,
0, 0, q, 0, 0, 0, 0, 0, 0, 0, 0, 0,
0, 0, 0, q, 0, 0, 0, 0, 0, 0, 0, 0,
0, 0, 0, 0, q, 0, 0, 0, 0, 0, 0, 0,
0, 0, 0, 0, 0, q, 0, 0, 0, 0, 0, 0,
0, 0, 0, 0, 0, 0, q, 0, 0, 0, 0, 0,
0, 0, 0, 0, 0, 0, 0, q, 0, 0, 0, 0,
0, 0, 0, 0, 0, 0, 0, 0, q, 0, 0, 0,
0, 0, 0, 0, 0, 0, 0, 0, 0, q, 0, 0,
0, 0, 0, 0, 0, 0, 0, 0, 0, 0, q, 0,
0, 0, 0, 0, 0, 0, 0, 0, 0, 0, 0, q]

5. error covariance matrix: 12×12
P=[p, 0, 0, 0, 0, 0, 0, 0, 0, 0, 0, 0,
0, p, 0, 0, 0, 0, 0, 0, 0, 0, 0, 0,
0, 0, p, 0, 0, 0, 0, 0, 0, 0, 0, 0,
0, 0, 0, p, 0, 0, 0, 0, 0, 0, 0, 0,
0, 0, 0, 0, p, 0, 0, 0, 0, 0, 0, 0,
0, 0, 0, 0, 0, p, 0, 0, 0, 0, 0, 0,
0, 0, 0, 0, 0, 0, p, 0, 0, 0, 0, 0,
0, 0, 0, 0, 0, 0, 0, p, 0, 0, 0, 0,
0, 0, 0, 0, 0, 0, 0, 0, p, 0, 0, 0,
0, 0, 0, 0, 0, 0, 0, 0, 0, p, 0, 0,
0, 0, 0, 0, 0, 0, 0, 0, 0, 0, p, 0,
0, 0, 0, 0, 0, 0, 0, 0, 0, 0, 0, p]

6. state vector: 12×1
x=[initial_x1,
initial_y1,
initial_x2,
initial_y2,
0,
0,
0,
0,
0,
0,
0,
0]

7. observation vector: 4×1
z=[current_x1,
current_y1,
current_x2,
current_y2]

Once the Kalman filter is set up as such, the Kalman filter with prediction by time update may be used to generate the estimated state vector $\hat{x}_k^-$ of the estimated bounding box and the estimated error covariance $P_k^-$ on the current video frame respectively from the previous state vector $\hat{x}_{k-1}$ of the previous bounding box and a previous error covariance $P_{k-1}$, corresponding to the object on the previous video frame utilizing the following formulas 1 and 2.

$$\hat{x}_k^- = A\hat{x}_{k-1} \qquad \text{<Formula 1>}$$

$$P_k^- = AP_{k-1}A^T + Q \qquad \text{<Formula 2>}$$

That is, current location information x=[predicted_x1, predicted_y1, predicted_x2, predicted_y2, ... ] tracked from a location of the previous bounding box, on the current video frame may be estimated from previous location information on the previous bounding box. Herein, (x1, y1) may be coordinates of the point on the top-left of the previous bounding box, and (x2, y2) may be coordinates of the point on the bottom-right thereof.

Again, by referring to FIG. 2, the testing device 100 may instruct a seed box selecting layer 124 to select at least one specific proposal box among the proposal boxes PB1, PB2, PB3, and PB4 by referring to the estimated bounding box EBB, as the seed box SB.

As one example, the testing device 100 may instruct the seed box selecting layer 124 to select a nearest proposal box to the estimated bounding box EBB, among the proposal boxes PB1, PB2, PB3, and PB4, as the seed box SB.

Herein, the testing device 100 may determine or support another device to determine the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

Then, the testing device 100 may instruct an FCN (Fully Convolutional Network) 125 to generate a position sensitive score map PSSM by applying the full convolution operations to the feature map FM, and may instruct a pooling layer 126 to generate at least one regression delta RD and at least one class score CS corresponding to the specific proposal box, i.e., the seed box SB, by applying at least one pooling operation to at least one region, on the position sensitive score map PSSM, corresponding to the seed box SB. Herein, the testing device may apply or support another device to apply the pooling operation to the at least one region, corresponding to the seed box SB, on the position sensitive score map PSSM, and apply or support another device to apply at least one global-pooling operation to the pooled position sensitive score map, to thereby output the regression delta RD and the class score CS corresponding to the specific proposal box.

Although the process of the RPN 122 using the feature map FM, the process of the seed box SB being selected by using the Kalman filter algorithm 123, and the process of the FCN 125 generating the position sensitive score map PSSM by using the feature map FM are described in sequence, these processes may be performed in parallel without regard to their order. For example, the generation of the PSSM may be performed beforehand and then the seed box may be selected.

Also, because the pooling layer 126 applies the pooling operation only to the single seed box SB corresponding to the object, it is possible to track the object with less computation, compared to prior art in which each of a plurality of proposal boxes corresponding to the object is pooled.

Next, the testing device 100 may generate or support another device to generate at least one current bounding box CBB corresponding to the object on the current video frame VF by referring to the regression delta RD and the seed box SB, and may adjust or support another device to adjust the current bounding box CBB by using the Kalman filter algorithm 123, to thereby output an adjusted bounding box ABB.

Herein, the Kalman filter algorithm 123 may generate a Kalman gain $K_k$ by using the estimated error covariance $P_k^-$ as shown in the following formula 3, update a current state vector $\hat{x}_k$ of the current bounding box CBB according to information $z_k$ on a position of the current bounding box CBB by using the Kalman gain $K_k$ and the estimated state vector $\hat{x}_k^-$ as shown in the following formula 4, and update a current error covariance $P_k$ of the current video frame by using the Kalman gain $K_k$ and the estimated error covariance $P_k^-$ as shown in the following formula 5.

$$K_k = P_k^- H^T (H P_k^- H^T + R)^{-1} \quad \text{<Formula 3>}$$

$$\hat{x}_k = \hat{x}_k^- + K_k(z_k - H\hat{x}_k^-) \quad \text{<Formula 4>}$$

$$P_k = (I - K_k H) P_k^- \quad \text{<Formula 5>}$$

On the other hand, before the processes of the testing device 100 described by referring to FIG. 1 to FIG. 8, the CNN including the tracking network may have been learned by a learning device.

That is, the learning device, not illustrated, may instruct the convolutional layers 121 to apply the convolution operations to at least one training image, i.e., the training image corresponding to the video frame, to thereby generate at least one feature map for training, may instruct the RPN 122 to generate the proposal boxes for training corresponding to regions estimated as including at least one object for training on the feature map for training, and may instruct the FCN 125 to apply the full convolution operations to the feature map for training, to thereby output at least one position sensitive score map for training. Then, the learning device may instruct the pooling layer 126 to pool each region, corresponding to each of the proposal boxes for training, on the position sensitive score map for training, to thereby generate each regression delta for training and each class score for training corresponding to each of the proposal boxes for training. Then, the learning device may instruct at least one loss layer, not illustrated, to generate at least one loss by referring to said each regression delta for training and said each class score for training corresponding to each of the proposal boxes for training, to thereby learn parameters of the FCN 125 and the convolutional layers 121 by backpropagating the loss.

Figure 9:
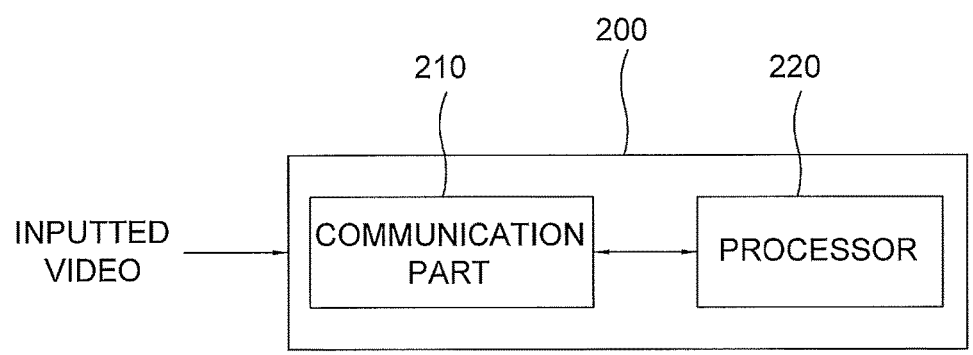
FIG. 9 is a drawing schematically illustrating a testing device for tracking the object by using the CNN including the tracking network in accordance with another example embodiment of the present invention.

Next, FIG. 9 is a drawing schematically illustrating a testing device 200 for tracking the object by using the CNN including the tracking network in accordance with another example embodiment of the present invention.

By referring to FIG. 9, the testing device 200 may include a communication part 210 and a processor 220.

First, the communication part 210 may receive the current video frame of the inputted video. Herein, the inputted video may include a sequence of images.

Then, the processor 220 may perform (i) a first process of generating at least one feature map by using the current video frame, and instructing the RPN to apply at least one operation to the feature map, to thereby generate information on one or more proposal boxes corresponding to the object, (ii) a second process of (ii-1) generating at least one estimated state vector of at least one previous bounding box, which has at least one possibility of including the object on the current video frame, from at least one previous state vector of the previous bounding box corresponding to the object positioned on a previous video frame by using the Kalman filter algorithm, (ii-2) generating at least one estimated bounding box, wherein the estimated bounding box corresponding to the estimated state vector includes information on an estimated position, on the current video frame, tracked from a location of the previous bounding box, and (ii-3) determining at least one specific proposal box selected by referring to the estimated bounding box among the proposal boxes as at least one seed box, (iii) a third process of instructing the pooling layer to pool at least one region, corresponding to the seed box, on the feature map, to thereby generate at least one feature vector, and instructing the FC layer to apply at least one fully connected operation to the feature vector, to thereby generate at least one regression delta and at least one class score corresponding to the specific proposal box, and (iv) a fourth process of generating at least one current bounding box corresponding to the object on the current video frame by referring to the regression delta and the seed box, and adjusting the current bounding box by using the Kalman filter algorithm.

Herein, the testing device 200 in accordance with another example embodiment of the present invention may be a computing device, and may be any device with a processor capable of computation. For reference, although FIG. 9 shows the single testing device 200, the scope of the present invention is not limited thereto. For example, the testing device may be configured as several devices to perform its functions.

Figure 10:
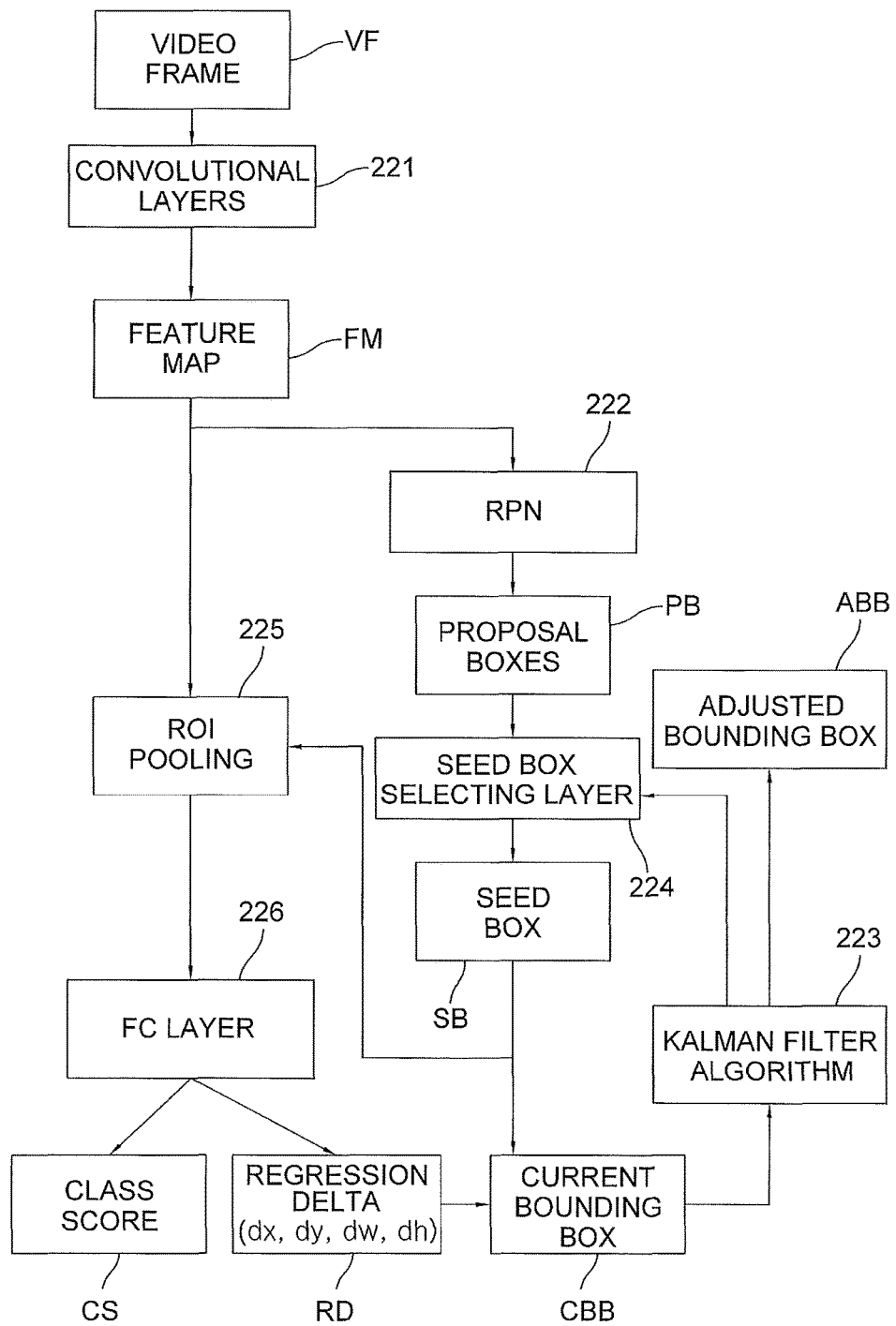
FIG. 10 is a drawing schematically illustrating a method for tracking the object by using the CNN including the tracking network in accordance with another example embodiment of the present invention.

A method for tracking the objects by using the testing device 200 utilizing the CNN including the tracking network in accordance with another example embodiment of the present invention is described by referring to FIG. 10 as follows. In the description below, the part easily deducible from the explanation of FIG. 1 to FIG. 8 will be omitted.

First, the testing device 200 may generate at least one feature map FM from the current video frame VF of the inputted video.

As one example, if a video taken by the vision sensor, not illustrated, is inputted, the testing device 200 may acquire or support another device to acquire the current video frame VF of the video, and may instruct one or more convolutional layers 221 to apply the convolution operations to the current video frame VF, to thereby output the feature map FM.

Next, the testing device 200 may input the feature map FM into the RPN 222, and may instruct the RPN to apply at least one operation to the feature map, to thereby generate information on the proposal boxes PB corresponding to the object.

As one example, the testing device 200 may instruct the RPN 222 to output the proposal boxes PB1, PB2, PB3, and PB4 corresponding to regions estimated as including the object on the feature map FM.

Then, the testing device 200 may generate or support another device to generate at least one estimated bounding box EBB which is a bounding box, tracked from a previous bounding box, whose position is estimated as at least one position of the object in the current video frame VF, where the previous bounding box is a bounding box corresponding to the object in the previous video frame, by using the Kalman filter algorithm 223.

Also, the testing device 200 may generate at least one estimated error covariance of the current video frame by referring to at least one previous error covariance of the previous video frame, by using the Kalman filter algorithm 223.

Then, the testing device 200 may instruct a seed box selecting layer 224 to select at least one specific proposal box among the proposal boxes PB1, PB2, PB3, and PB4 by referring to the estimated bounding box EBB, as the seed box SB.

The, the testing device 200 may instruct the pooling layer 225 to pool at least one region, corresponding to the seed box SB, on the feature map, to thereby generate at least one feature vector, and may instruct an FC layer 226 to apply the fully connected operation to the feature vector, to thereby generate at least one regression delta RD and at least one class score CS corresponding to the specific proposal box, i.e., the seed box SB.

Next, the testing device 200 may generate or support another device to generate at least one current bounding box CBB corresponding to the object on the current video frame VF by referring to the regression delta RD and the seed box SB, and may adjust or support another device to adjust the current bounding box by using the Kalman filter algorithm 223, to thereby output the adjusted bounding box ABB.

On the other hand, before the processes of the testing device aforementioned, the CNN including the tracking network may have been learned by the learning device.

That is, the learning device, not illustrated, may instruct the convolutional layers 221 to apply the convolution operations to at least one training image, i.e., the training image corresponding to the video frame, to thereby generate at least one feature map for training, and may instruct the RPN 222 to output the proposal boxes for training corresponding to at least one region estimated as including the object for training on the feature map for training. Then, the learning device may instruct the pooling layer 225 to pool each region, corresponding to each of the proposal boxes for training, on the feature map for training, to thereby generate each feature vector for training corresponding to each of the proposal boxes for training, and may instruct the FC layer 226 to apply the fully connected operation to said each feature vector for training corresponding to each of the proposal boxes for training, to thereby generate each regression delta for training and each class score for training corresponding to each of the proposal boxes for training. Thereafter, the learning device may instruct at least one loss layer, not illustrated, to generate at least one loss by referring to said each regression delta for training and said each class score for training corresponding to each of the proposal boxes for training, to thereby learn parameters of the FCN 226 and the convolutional layers 221 by backpropagating the loss.

The present invention has an effect of providing a method for tracking the object by using the CNN including the tracking network.

The present invention has another effect of providing the CNN including the tracking network without a need for learning of tracking the object.

The present invention has still another effect of minimizing development time and cost of object tracking by providing the method for tracking the object using the CNN learned by an object detector.

The present invention has still yet another effect of providing the method for tracking the object with less computation compared to a conventional CNN for the object detection.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for tracking at least one object by using a CNN including a tracking network, comprising steps of:
   (a) a testing device, generating at least one feature map by using a current video frame of an inputted video, and instructing an RPN to apply at least one operation to the feature map, to thereby generate information on one or more proposal boxes corresponding to the object;
   (b) the testing device (i) (i-1) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (i-2) generating at least one estimated bounding box, wherein the estimated bounding box corresponding to the estimated state vector includes information on an estimated position, on the current video frame, tracked from a location of the previous bounding box, and (i-3) determining at least one specific proposal box selected by referring to the estimated bounding box among the proposal boxes as at least one seed box, and (ii) instructing an FCN to apply one or more full convolution operations to the feature map, to thereby output at least one position sensitive score map;
(c) the testing device instructing at least one pooling layer to pool at least one region, corresponding to the seed box, on the position sensitive score map, to thereby generate at least one regression delta and at least one class score corresponding to the specific proposal box; and
(d) the testing device generating at least one current bounding box corresponding to the object on the current video frame by referring to the regression delta and the seed box, and adjusting the current bounding box by using the Kalman filter algorithm.

2. The method of claim 1, wherein, at the step of (b), the testing device generates at least one estimated error covariance of the current video frame by referring to at least one previous error covariance of the previous video frame, by using the Kalman filter algorithm.

3. The method of claim 2, wherein, at the step of (d), the testing device generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

4. The method of claim 1, wherein, at the step of (c), the testing device applies a pooling operation to the at least one region, corresponding to the seed box, on the position sensitive score map, and applies a global-pooling operation to the pooled position sensitive score map, to thereby output the regression delta and the class score corresponding to the specific proposal box.

5. The method of claim 1, wherein, at the step of (b), the testing device determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

6. The method of claim 1, wherein, at the step of (a), the testing device instructs at least one convolutional layer to apply one or more convolution operations to the current video frame, to thereby generate the feature map, and instructs the RPN to output the proposal boxes corresponding to regions estimated as including the object on the feature map.

7. The method of claim 6, wherein, before the step of (a), a learning device (i) has instructed the convolutional layer to apply one or more convolution operations to at least one training image, to thereby generate at least one feature map for training, (ii) (ii-1) has instructed the RPN to generate each of one or more proposal boxes for training corresponding to each region estimated as including at least one object for training on the feature map for training, (ii-2) has instructed the FCN to apply one or more full convolution operations to the feature map for training, to thereby generate at least one position sensitive score map for training, (iii) has instructed the pooling layer to pool said each region on the position sensitive score map for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn parameters of the FCN and the convolutional layer by backpropagating the loss.

8. A method for tracking at least one object by using a CNN including a tracking network, comprising steps of:
(a) a testing device, generating at least one feature map by using a current video frame of an inputted video, and instructing an RPN to apply at least one operation to the feature map, to thereby generate information on one or more proposal boxes corresponding to the object;
(b) the testing device (i) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (ii) generating at least one estimated bounding box, wherein the estimated bounding box corresponding to the estimated state vector includes information on an estimated position, on the current video frame, tracked from a location of the previous bounding box, and (iii) determining at least one specific proposal box selected by referring to the estimated bounding box among the proposal boxes as at least one seed box;
(c) the testing device instructing at least one pooling layer to pool at least one region, corresponding to the seed box, on the feature map, to thereby generate at least one feature vector, and instructing at least one FC layer to apply at least one fully connected operation to the feature vector, to thereby generate at least one regression delta and at least one class score corresponding to the specific proposal box; and
(d) the testing device generating at least one current bounding box corresponding to the object on the current video frame by referring to the regression delta and the seed box, and adjusting the current bounding box by using the Kalman filter algorithm.

9. The method of claim 8, wherein, at the step of (b), the testing device generates at least one estimated error covariance of the current video frame by referring to at least one previous error covariance of the previous video frame, by using the Kalman filter algorithm.

10. The method of claim 9, wherein, at the step of (d), the testing device generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

11. The method of claim 8, wherein, at the step of (b), the testing device determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

12. The method of claim 8, wherein, at the step of (a), the testing device instructs at least one convolutional layer to apply one or more convolution operations to the current video frame, to thereby generate the feature map, and instructs the RPN to output the proposal boxes corresponding to regions estimated as including the object on the feature map.

13. The method of claim 12, wherein, before the step of (a), a learning device (i) has instructed the convolutional layer to apply the convolution operations to at least one training image, to thereby generate at least one feature map for training, (ii) has instructed the RPN to generate each of one or more proposal boxes for training corresponding to each region estimated as including at least one object for training on the feature map for training, (iii) has instructed the pooling layer to pool said each region, corresponding to said each of the proposal boxes for training, on the feature map for training, to thereby generate at least one feature vector for training, corresponding to said each of the proposal boxes for training, and has instructed the FC layer to apply the fully connected operation to the feature vector for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn parameters of the FCN and the convolutional layer by backpropagating the loss.

14. A testing device for tracking at least one object by using a CNN including a tracking network, comprising:
a communication part for acquiring at least one current video frame of an inputted video; and
a processor for performing processes of (I) generating at least one feature map by using the current video frame, and instructing an RPN to apply at least one operation to the feature map, to thereby generate information on one or more proposal boxes corresponding to the object, (II) (II-1) (i) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (ii) generating at least one estimated bounding box, wherein the estimated bounding box corresponding to the estimated state vector includes information on an estimated position, on the current video frame, tracked from a location of the previous bounding box, and (iii) determining at least one specific proposal box selected by referring to the estimated bounding box among the proposal boxes as at least one seed box, and (II-2) instructing an FCN to apply one or more full convolution operations to the feature map, to thereby output at least one position sensitive score map, (III) instructing at least one pooling layer to pool at least one region, corresponding to the seed box, on the position sensitive score map, to thereby generate at least one regression delta and at least one class score corresponding to the specific proposal box, and (IV) generating at least one current bounding box corresponding to the object on the current video frame by referring to the regression delta and the seed box, and adjusting the current bounding box by using the Kalman filter algorithm.

15. The testing device of claim 14, wherein, at the process of (II), the processor generates at least one estimated error covariance of the current video frame by referring to at least one previous error covariance of the previous video frame, by using the Kalman filter algorithm.

16. The testing device of claim 15, wherein, at the process of (IV), the processor generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

17. The testing device of claim 14, wherein, at the process of (III), the processor applies a pooling operation to the at least one region, corresponding to the seed box, on the position sensitive score map, and applies a global-pooling operation to the pooled position sensitive score map, to thereby output the regression delta and the class score corresponding to the specific proposal box.

18. The testing device of claim 14, wherein, at the process of (II), the processor determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

19. The testing device of claim 14, wherein, at the process of (I), if at least one test image corresponding to the current video frame is acquired, the processor instructs at least one convolutional layer to apply one or more convolution operations to the test image, to thereby generate the feature map, and instructs the RPN to output the proposal boxes corresponding to regions estimated as including the object on the feature map.

20. The testing device of claim 19, wherein, before the process of (I), a learning device (i) has instructed the convolutional layer to apply one or more convolution operations to at least one training image, to thereby generate at least one feature map for training, (ii) (ii-1) has instructed the RPN to generate each of one or more proposal boxes for training corresponding to each region estimated as including at least one object for training on the feature map for training, (ii-2) has instructed the FCN to apply one or more full convolution operations to the feature map for training, to thereby generate at least one position sensitive score map for training, (iii) has instructed the pooling layer to pool said each region on the position sensitive score map for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn the parameters of the FCN and the convolutional layer by backpropagating the loss.

21. A testing device for tracking at least one object by using a CNN including a tracking network, comprising:
a communication part for acquiring at least one current video frame of an inputted video; and
a processor for performing processes of (I) generating at least one feature map by using the current video frame, and instructing an RPN to apply at least one operation to the feature map, to thereby generate information on one or more proposal boxes corresponding to the object, (II) (i) generating at least one estimated state vector of at least one previous bounding box, which has at least one possibility of including the object on the current video frame, from at least one previous state vector of the previous bounding box corresponding to the object positioned on a previous video frame by using a Kalman filter algorithm, (ii) generating at least one estimated bounding box, wherein the estimated bounding box corresponding to the estimated state vector includes information on an estimated position, on the current video frame, tracked from a location of the previous bounding box, and (iii) determining at least one specific proposal box selected by referring to the estimated bounding box among the proposal boxes as at least one seed box, (III) instructing at least one pooling layer to pool at least one region, corresponding to the seed box, on the feature map, to thereby generate at least one feature vector, and instructing at least one FC layer to apply at least one fully connected operation to the feature vector, to thereby generate at least one regression delta and at least one class score corresponding to the specific proposal box, and (IV) generating at least one current bounding box corresponding to the object on the current video frame by referring to the regression delta and the seed box, and adjusting the current bounding box by using the Kalman filter algorithm.

22. The testing device of claim 21, wherein, at the process of (II), the processor generates at least one estimated error covariance of the current video frame by referring to at least one previous error covariance of the previous video frame, by using the Kalman filter algorithm.

23. The testing device of claim 22, wherein, at the process of (IV), the processor generates a Kalman gain by using the estimated error covariance, updates a current state vector of the current bounding box according to information on a position of the current bounding box by using the Kalman gain and the estimated state vector, and updates a current error covariance of the current video frame by using the Kalman gain and the estimated error covariance.

24. The testing device of claim 21, wherein, at the process of (II), the processor determines the seed box by referring to one of (i) location information on the estimated bounding box and each piece of location information on each of the proposal boxes, (ii) each superposing area between the estimated bounding box and each of the proposal boxes, and (iii) the location information on the estimated bounding box, each piece of the location information on each of the proposal boxes, and said each superposing area.

25. The testing device of claim 21, wherein, at the process of (I), the processor instructs at least one convolutional layer to apply one or more convolution operations to the current video frame, to thereby generate the feature map, and instructs the RPN to output the proposal boxes corresponding to regions estimated as including the object on the feature map.

26. The testing device of claim 25, wherein, before the process of (I), a learning device (i) has instructed the convolutional layer to apply the convolution operations to at least one training image, to thereby generate at least one feature map for training, (ii) has instructed the RPN to generate each of one or more proposal boxes for training corresponding to each region estimated as including at least one object for training on the feature map for training, (iii) has instructed the pooling layer to pool said each region, corresponding to said each of the proposal boxes for training, on the feature map for training, to thereby generate at least one feature vector for training, corresponding to said each of the proposal boxes for training, and has instructed the FC layer to apply the fully connected operation to the feature vector for training, to thereby generate each regression delta for training and each class score for training corresponding to each of the proposal boxes for training, and (iv) has instructed at least one loss layer to generate at least one loss by referring to said each regression delta for training, said each class score for training, and each of their corresponding GTs, to thereby learn the parameters of the FCN and the convolutional layer by backpropagating the loss.

* * * * *